United States Patent Office 3,235,328
Patented Feb. 15, 1966

3,235,328
SULFUROUS ACID LEACHING AND REDUCTIVE CHLORINATION OF HIGH MELTING METAL-CONTAINING ORES
Bernard J. Lerner, O'Hara Township, Allegheny County, Pa., and Clifford J. Lewis, Lakewood, Colo., assignors to Dominion Gulf Company, Pittsburgh, Pa., a corporation of Pennsylvania
No Drawing. Filed June 15, 1962, Ser. No. 202,671
6 Claims. (Cl. 23—15)

This invention relates to an extractive metallurgical process for recovering high melting metals from chemically nonrefractory, carbonate-containing ores that also contain a large proportion of gangue materials relative to such metals, and more particularly, to the recovery of columbium (niobium) or like metal values from low grade calcareous ores containing the same in a chemically nonrefractory form by sulfurous acid leaching and reductive chlorination.

The recovery of columbium and other high melting metals from ores of the pyrochlore type—that is, ores in which the metal is present in the form of a complex oxygen- and fluorine-containing material, and that can be concentrated or beneficiated only with difficulty or not at all—can be effected by a variety of direct chemical extraction procedures. However, direct chemical extraction of low grade ores is frequently not entirely satisfactory owing to unduly large consumption of chemical treating reagents by reaction with the gangue materials. To avoid excessive consumption of chemical treating reagent by reaction with the gangue materials, the carbonate content of ores containing the same can be advantageously reduced or eliminated by a number of chemical beneficiating procedures prior to direct chemical extraction of the desired metal from the ore.

It has now been found that special advantages in the way of low throughputs of chemical extracting agent, a high degree of metal extraction, and good purity of extracted product are achievable by a particular novel combination of chemical beneficiating and chemical extracting procedures, and the present invention relates to this combination of procedures. More particularly, in accordance with the process of this invention, a high melting metal that forms a low boiling chloride is recovered from a chemically nonrefractory, carbonate-containing ore that contains such metal and that also contains a predominant proportion of gangue materials, by first dissolving carbonates from said ore by leaching the ore with aqueous sulfurous acid, and separating the leached solids from the attendant liquor. The high melting metal values in the ore are then converted to vaporous chloride form by reductive chlorination of the leached solids with a vapor phase reductive chlorinating agent, such as an organic or inorganic chloride that forms a nonhydrogenous reducing agent at the conditions of the reaction. Carbon tetrachloride is a specific example of a useful organic chlorinating agent, but other suitable chlorinating agents, for example, phosgene, as well as still other agents of the kind indicated can be used satisfactorily. The reductive chlorination is carried out at a temperature sufficient to form the chloride of the metal to be extracted and sufficient to volatilize the same, but insufficient to chlorinate a substantial proportion of the gangue materials. Ordinarily, the reductive chlorination will be carried out at a temperature in the range of about 240° C. and about 450° C., preferably about 315° C. to 400° C. The metals extracted from the ore are removed as vaporous chlorides from the reaction mixture. The desired metallic chlorides are thereafter recovered from the over-all mixture of vaporous chlorides. Although the process of this invention is especially beneficial in connection with low grade columbium- and tantalum-containing ores of the pyrochlore or complex oxygen- and fluorine-containing type, the process also can be used to extract other high melting point metals that are capable of forming low boiling chlorides from carbonate-containing ores that contain such metals in a chemically nonrefractory form, and the extraction of such other metals is included by the present invention.

The exact mechanism by which the unusual advantages of the present invention are obtained has not been definitely established. It may be that sulfurous acid leaching is especially beneficial from the standpoint of subsequent reductive chlorination in that sulfurous acid may fail to remove or decompose certain gangue materials that serve a useful function in the reductive chlorination mechanism, whereas other acids capable of dissolving carbonates do remove or decompose these materials. In any event, experimental results clearly indicate that an unusual interaction between the two treating procedures of the present invention does occur, as the combination of sulfurous acid leaching followed by reductive chlorination has been found to be markedly superior to leaching with another acid, such as hydrochloric acid, followed by reductive chlorination. Thus, when compared to an identical procedure using an acid stronger than sulfurous acid as the leaching agent, sulfurous acid leaching of a columbium-containing pyrochlore ore followed by reductive chlorination in accordance with the present invention was found to produce satisfactory columbium extractions for lower chlorinating agent throughputs, or, alternatively, greater columbium recovery for equal chlorinating agent throughputs, greater consistency in the proportion of columbium extracted, and greater purity of chlorinated product with respect to unwanted metals, such as iron.

The sulfurous acid leaching procedure can be carried out in any suitable way. For example, good results can be obtained simply by forming an aqueous slurry of the finely divided ore and injecting sulfur dioxide gas into the slurry in an amount sufficient to dissolve the sulfurous acid-soluble carbonate content of the ore, preferably such amount is in excess of the stoichiometric amount. Good results have been obtained with aqueous slurries containing 25 percent solids by weight, but other water-solids ratios can be used, for example, water:solids ratios of 2:1 to 5:1 are satisfactory. In order that intimate contact can be obtained between the ore particles in the sulfurous acid the ore is desirably finely ground. Since the subsequent reductive chlorination procedure is advantageously conducted with the leached solids in the form of a fluidized solids bed, it is convenient to reduce the ore to a particle size in the fluidizable solids range in the first instance, that is, of a size to permit fluidization at superficial linear fluidizing gas velocities in the range of about 0.03 to 1.5 feet per second, preferably 0.5 to 1 foot per second. Satisfactory results have been obtained when the ore is ground sufficiently small to pass a 100-mesh screen, but other particle sizes, for example, in the range of about −50 to +400 mesh can be used. Although it is possible to add sulfurous acid leaching solution to the aqueous slurry of ore, or to prepare the aqueous slurry from an aqueous sulfurous acid solution in the first instance, we prefer to form the sulfurous acid by injecting sufur dioxide gas into the aqueous slurry after the latter has been prepared. Injection and digestion are preferably continued until the pH of the aqueous slurry diminishes to a value of at least about 3, and preferably lower, at which time all or most of the soluble carbonates will have been dissolved. The desired leaching of carbonates takes place satisfactorily at ambient atmospheric temperatures and pressures, but moderately elevated temperatures and pressures can serve to accelerate the reaction somewhat. One particularly advantageous sulfurous acid leaching procedure involving the use of a closed system and ambient atmospheric temperatures and pressures is disclosed in United States Patent No. 3,025,131 to B. J. Lerner.

Separation of leached solids from attendant liquor is conveniently effected by conventional liquid-solids separating systems. Filtration has been found suitable as a separation method, but separation can also be effected by centrifuging, gravity settling or other effective methods.

In carrying out the reductive chlorination of the ore, any suitable reductive chlorinating agent that will be in vapor phase at the reaction conditions and that is capable of yielding a substantially hydrogen-free reducing agent at the reaction conditions can be used. Phosgene is an example of a preferred agent, but other organic or inorganic chlorides can be used. Examples of other chlorides of both classes are carbon tetrachloride, octachloropropane, hexachloroethane, sulfur monochloride, sulfur dichloride, and equivalents thereof. These materials can be employed as such or they can be diluted with a carrier gas, such as nitrogen or argon.

Reasonable columbium recovery can be obtained at reductive chlorination temperatures as low as about 240° C., but temperatures at least as great as the boiling point of ferric chloride, about 315° C., are preferred when iron is present in the ore, as will normally be the case, in order to minimize agglomeration of ore particles and in order to obtain good chlorination selectivity. Somewhat higher temperatures, for example up to about 450° C. or more, can be employed, but chlorination selectivity declines with increasing temperature. Accordingly, when the temperature of the chlorination reaction is too high, undue losses of chlorine to the gangue materials will be encountered, and a heavier load may be placed upon the chloridized product purification facilities. The reaction is suitably carried out at ambient atmospheric pressures or at pressures slightly in excess thereof such as are typically encountered in fluidized solids reaction systems, but greater or lesser pressures can be used.

The reductive chlorination reaction is thought to take place rapidly, especially when the ore is subjected to a preliminary activating treatment with oxygen or oxygen-containing gas, as is preferred. At the preferred reaction conditions, there is reason to believe that a reaction time of a few minutes may be all that is involved. However, as a practical matter, when dealing with large masses of ore longer times of contact may be desirable to insure thorough contact between the chlorinating agent and the ore particles. When operating with a fluidized bed of ore at reductive chlorinating temperatures of about 350° C., good columbium extractions are obtainable with average reactor residence times for the ore, that is, reaction times, of about 20 to 45 minutes, although longer or shorter times can be used.

The amount of chlorinating agent employed should of course be sufficient to chlorinate all of the columbium or other metal to be recovered in the ore. The absolute amount required for this purpose will of course vary with the columbium content of the ore and the chlorinating agent employed. In order to allow for chlorine losses and less than 100 percent chlorine utilization, we prefer to employ the reductive chlorinating agent in an amount such that the available chlorine will be at least about 3 and preferably about 5 to 20 times the stoichiometric amount required to react with the columbium present in the ore. Thus, where the columbium content of an ore is about 0.6 percent, calculated as columbium oxide, good columbium extraction will be obtained by the use of the reductive chlorinating agent in an amount sufficient to provide about 3 to 18 pounds or more of chlorine per 100 pounds of ore. Not all of the chlorine supplied to the reactor need be in the form of fresh chlorinating agent, and part can be supplied by recycling the unreacted chlorine in the reaction off-gas. An indication of the suitability of the off-gas for recycle is given by the following off-gas analysis which was obtained while charging 7.87 pounds of columbium pyrochlore ore per pound of carbon tetrachloride to the chlorination reaction:

GAS, PERCENT, ADJUSTED FOR 0 PERCENT NITROGEN AND ARGON

| | |
|---|---|
| $O_2$ | 7.3 |
| $CO_2$ | 17.7 |
| $CO$ | 8.3 |
| $COCl_2$ | 27.4 |
| $CCl_4$ | 21.2 |
| $S_2Cl_2$ | 0 |
| $HCl$ | 13.1 |
| $Cl_2$ | 5.0 |

Inasmuch as the reductive chlorination treatment involves a chemical reaction, contact between the ore and the chlorinating agent again should be intimate. To this end, what has been said with respect to ore particle size, contacting methods and the like regarding the sulfurous acid leaching treatment also applies here. Thus, best contact is obtained by reacting the ore in finely divided form, preferably in a form sufficiently small, for example, less than 65 mesh, to permit fluidization at superficial linear gas velocities of about 0.03 feet to 1.5 feet per second and preferably 0.5 to 1.0 feet per second. Not all of the fluidizing gas need be fresh and/or recycle chlorinating agent, and part of the fluidizing gas requirements can be supplied by diluent gases.

The herein-disclosed process has been found highly effective for use in connection with low-grade columbium pyrochlore ores, which are distinguished from ordinary columbite ores, among other things, by their oxygen- and fluorine-containing composition, by the difficulty with which they can be concentrated or beneficiated, and more particularly for purposes of this invention, by the fact that they are chemically nonrefractory. The partial analysis of one sample of a columbium pyrochlore ore of the kind to which the present process is applicable was as follows:

| | Percent |
|---|---|
| Calcium carbonate | 9.5 |
| Iron | 11.82 |
| Fluorine | 0.10 |
| Columbium | 0.32 |

Other materials found to be present in appreciable amounts by analysis of both unvaporized chlorination tailings and vaporized chlorination products are Al, Si, Na, and in trace amounts, Mg, Ti, Mn, K, Zr, Ba, and Cu. The raw ore was a pyroxenitic ore containing large amounts of facmite and aegirite type minerals, with minor amounts of feldspar, wollastonite, biotite, quartz, and apatite as gangue materials, together with a small amount of pyrochlore. However, the invention is not limited to such ores and is considered useful in connection with other high melting point metal ores that are chemically nonrefractory in their naturally occurring form, especially ores of metals of Groups IV and V of the Periodic Table of Mendelyeev that form low-boiling chlorides. A specific example of such a metal is tantalum. Examples of other high melting metals that form low-boiling chlorides or oxychlorides are titanium, vanadium, chromium, zirconium, molybdenum, and tungsten. Contrary to what might be expected, the presence of predominant proportions of gangue materials relative to the desired metal is not harmful, as the process is essentially selective for metals that form low-boiling chlorides. In fact, the presence of the gangue materials appears to be beneficial.

In order to facilitate good columbium recovery at the relatively moderate temperatures disclosed herein, it is preferred that the ores to be processed be subjected to a preliminary activation treatment, prior to chlorination, in the manner disclosed in copending application Serial No. 175,841 filed February 26, 1962, in the name of B. J. Lerner, but such preliminary activation is not essential. Briefly, such activation involves intimately contacting the ore in finely divided form, ordinarily in a fluidized bed, with oxygen, either as such or in the form of a mixture such as air, at an elevated temperature, typically in the range of about 200° C. to about 500° C., preferably about 300° C. to 450° C., in a ratio ordinarily in the range of about 0.017 pounds or more, preferably about 6.1 pounds or more, of oxygen per pound of ore, and for a time, usually in the range of about 20 minutes to 12 hours, effective to increase the susceptibility of the ore to chlorination under the conditions disclosed herein.

Moisture in the ore, both adsorbed and chemically combined, is preferably reduced to a small amount before reductive chlorination in accordance with the herein-disclosed process, as its presence results in hydrolysis of the chlorinated metal to oxychloride, which, in the case of columbium, is a harmful impurity. Unless steps are taken to separate the oxychloride and/or to convert it into the corresponding chloride, it may tend to introduce oxygen into the final purified metal, whereby the properties of such metal itself are adversely affected. The moisture content of the ore is preferably maintained in the range of about 0 to 0.2 percent, but somewhat higher moisture content, say up to about 0.4 percent, can be tolerated, without undue losses of columbium to oxychloride. Normally, the moisture content of the ore will not be a serious problem, as the oxygen activation pretreatment described herein will be effective incidentally to reduce the moisture content to the preferred range.

Separation of gaseous metal chlorides from the reaction off-gases, purification of the resulting metal chlorides, and conversion of the desired metal chloride to the pure metal can be effected in any convenient way, as these steps as such do not go to the essence of the herein-described invention. Thus, for example, crude metal halides can be conveniently separated from reaction off-gases by fractional condensation. The condensed metal chlorides can then be further purified as desired. Thus, while the process as defined herein is essentially selective for the high melting metals in the ore that form low-boiling chlorides in the sense that only a small percent of the ore is chlorinate and volatilized, some impurities, notably ferric chloride, may be present in the voltalized reaction off-gases. This material is conveniently removed from the metal chloride gas stream by a passage through a salt bed. The ferric chloride can then be removed from the salt bed in the form of a low-melting eutectic solution. The desired metal chloride can ordinarily be separated from any other metal chlorides that may be present by fractional condensation, or by other means. The desired metal can then be recovered from the chloride form by reduction with hydrogen. Unreacted chlorinating agents can be removed from the residual gases by established techniques, such as absorption and stripping combinations, condensation, or the like.

In order to demonstrate the effect on metal extraction of the herein-disclosed combination of procedures, a pyrochlore ore having a columbium content of approximately 0.6 percent by weight, calculated as $Cb_2O_5$, and a calcite (calcium carbonate) content of approximately nine percent by weight, the balance being substantially all other gangue materials, principally sodium iron silicates, was ground to pass a 100-mesh screen and admixed with water to furnish a slurry containing 25 percent solids by weight. Sulfur dioxide gas was then injected into the slurry under ambient atmospheric conditions at a steady rate of approximately 0.57 cubic foot per hour, and digestion was continued until the pH of the attendant liquor was 1.2. The treated ore particles were filtered, washed with water and dried. Separate samples of the dried, leached ore were obtained containing columbium in amounts of 0.86 and 0.92 percent by weight calculated as $Cb_2O_5$. One kilogram samples of the leached ore were independently charged to a 7.2 centimeter inside diameter fluidized fixed bed reactor and the ore was activated for reductive chlorination by fluidizing with two liters per minute of air for one hour (except as otherwise indicated hereinafter) at 350° C. Following pretreatment in this manner, reductive chlorination of the columbium to vaporous columbium pentachloride is effected by introduction into the reactor of carbon tetrachloride, at the rate of about six grams per minute, vaporized into a carrier stream of air flowing at one liter per minute. The total reaction time was determined by the total amount of carbon tetrachloride introduced into the reactor. Off-gases evolved from the reactor as vapors were collected and conducted to an air-cooled condenser, where columbium pentachloride, together with any metal chloride impurities such as ferric chloride, were removed by condensation. The results of the chlorination of sulfurous acid leached ore are set forth in the following table:

Table

| Run No. | Throughput, Grams $CCl_4$ Per Gram Leached Ore | Heads $Cb_2O_5$ Content, Percent | Tails $Cb_2O_5$ Content, Percent | Cb Extraction, Percent | Product $Cb_2O_5$ Content, Percent | Product FeO Content, Percent |
|---|---|---|---|---|---|---|
| 1 | 0.045 | 0.92 | 0.05 | 94.5 | 56 | 43 |
| 2 | 0.045 | 0.92 | 0.05 | 94.5 | 57 | 44 |
| 3 | 0.062 | 0.92 | 0.04 | 95.6 | | |
| 4 | 0.062 | 0.92 | 0.05 | 94.6 | 56 | 45 |
| 5* | 0.075 | 0.86 | 0.04 | 95.4 | 49 | 47 |
| 6* | 0.075 | 0.86 | 0.01 | 99.0 | | |

*Air carrier rate=two liters per minute.

Examination of the foregoing experimental results indicates that excellent columbium extractions of say 90 percent or more, are achievable at very low $CCl_4$ throughputs. This is in contrast to the results obtained by comparable reductive chlorination of the same ore whose carbonate content had been leached by an acid other than sulfurous, wherein columbium extractions, averaging only 67.5 and 68.3 percent, were obtained for throughputs of 0.04 and 0.06 gram $CCl_4$ and 0.06 gram $CCl_4$ per gram of ore. It also will be noted that columbium extractions are consistently high in duplicate runs. This also is in contrast to results obtained with identical ore samples in which the carbonates were leached with an acid other than sulfurous. The above-indicated experimental results also show that the columbium content of the condensed product chlorides is relatively high. In contrast, the columbium content of condensed product chlorides obtained by reductive chlorination of ore whose carbonate content had been leached by an acid other than sulfurous was found to vary between 20 and 35 percent for comparable $CCl_4$ throughputs.

Good results can also be obtained by substitution in the preceding embodiments of other chemically nonrefractory, calcareous ores containing predominant proportions of gangue materials and that contain high melting point metals that form low boiling chlorides, of the kind disclosed herein, and by the substitution of other equivalent reductive chlorinating agents as disclosed herein. Similarly, good results will also be obtained by varying the process conditions in the manner and within the limits indicated herein.

Advantages other than those pertaining to columbium recovery also accrue from the use of sulfurous acid leaching prior to reductive chlorination. Thus, sulfurous acid is relatively inexpensive, it can be handled as a gas ($SO_2$), whereby the strength of the acid in the leaching vessel can be continuously maintained without continuous introduction and withdrawal of liquid, and sulfurous anhydride ($SO_2$) can be generated from leach liquors at relatively low cost.

We claim:

1. An extractive metallurgical process for recovering in chloride form a high-melting, low-boiling chloride forming metal selected from the group consisting of columbium, tantalum, titanium, vanadium, chromium, zirconium, molybdenum and tungsten from a carbonate-bearing ore containing such metal that is nonrefractory to reductive chlorination and that also contains a predominant proportion of gangue materials other than carbonates, comprising dissolving carbonates in said ore by leaching the same with aqueous sulfurous acid, and continuing such leaching until the pH of the reaction mixture reaches a value not greater than about 3, separating the leached solids from the attendant liquor and drying the leached solids to a moisture content in the range of about 0 to 0.4 percent, forming a vaporous chloride of said metal by reductive chlorination of said leached and dried solids with a vapor phase reductive chlorinating agent selected from the group consisting of phosgene, carbon tetrachloride, hexachloroethane, octachloropropane, sulfur monochloride and sulfur dichloride, that forms a nonhydrogenous reducing agent at the conditions of the reaction, at a temperature in the range of about 240° C. to 450° C. and sufficient to form said vaporous metal chloride but insufficient to chlorinate a substantial proportion of the gangue materials, removing vapor phase materials from the reaction mixture and recovering metal chloride therefrom.

2. The process of claim 1 where the reductive chlorination is carried out with the leached solids in the form of a fluidized bed.

3. The process of claim 1 where said ore is a columbium pyrochlore ore and said metal is columbium.

4. The process of claim 1 where said reductive chlorinating agent is selected from the group consisting of phosgene and carbon tetrachloride.

5. An extractive metallurgical process for recovering in chloride form a high-melting, low-boiling chloride forming metal selected from the group consisting of columbium, tantalum, titanium, vanadium, chromium, zirconium, molybdenum and tungsten from a carbonate-bearing ore containing such metal that is nonrefractory to reductive chlorination and that also contains a predominant proportion of gangue materials other than carbonates, comprising leaching carbonates from said ore by injecting sulfur dioxide into an aqueous slurry of the ore in finely divided form, said slurry having a water:solids ratio in the range of about 2:1 to 5:1, and continuing digestion of the ore until the carbonate content thereof is substantially reduced and until the pH of the slurry diminishes to at least about 3, separating the leached solids from the attendant liquor and drying the leached solids to a moisture content in the range of about 0 to 0.4 percent, and forming a vaporous chloride of said metal by reductive chlorination of said leached and dried solids with a vapor phase reductive chlorinating agent that forms a nonhydrogenous reducing agent at the conditions of the reaction, said agent being selected from the group consisting of phosgene and carbon tetrachloride, in a proportion sufficient to provide about 3 to 20 times the stoichiometric amount of chlorine required to react with said metal, at a temperature in the range of about 300° C. to 400° C. and sufficient to form said vaporous metal chloride but insufficient to chlorinate a substantial proportion of the gangue materials, removing vapor phase materials from the reaction mixture and recovering metal chloride therefrom.

6. An extractive metallurgical process for recovering in chloride form a high-melting, low-boiling chloride forming metal selected from the group consisting of columbium, tantalum, titanium, vanadium, chromium, zirconium, molybdenum and tungsten from a carbonate-bearing ore containing such metal that is nonrefractory to reductive chlorination and that also contains a predominant proportion of gangue materials other than carbonates, comprising leaching carbonates from said ore by injecting sulfur dioxide into an aqueous slurry of the ore in finely divided form, said slurry having a water:solids ratio in the range of about 2:1 to 5:1, and continuing digestion of the ore until the carbonate content thereof is substantially reduced and until the pH of the slurry diminishes to at least about 3, separating the leached solids from the attendant liquor, activating the leached solids for reductive chlorination and drying said solids to a moisture content in the range of about 0 to 0.4 percent by intimately contacting the same in finely divided form with oxygen at an elevated temperature in the range of about 200° C. to 500° C. for at least about 20 minutes, and forming a vaporous chloride of said metal by reductive chlorination of said leached and dried solids with a vapor phase reductive chlorinating agent that forms a nonhydrogenous reducing agent at the conditions of the reaction, said agent being selected from the group consisting of phosgene and carbon tetrachloride, in a proportion sufficient as to provide about 3 to 20 times the stoichiometric amount of chlorine required to react with said metal, at a temperature in the range of about 300° C. to 400° C. and sufficient to form said vaporous metal chloride but insufficient to chlorinate a substantial proportion of the gangue materials, removing vapor phase materials from the reaction mixture and recovering metal chloride therefrom.

References Cited by the Examiner

UNITED STATES PATENTS

| | | | |
|---|---|---|---|
| 1,898,018 | 2/1933 | Meyer | 75—113 |
| 1,959,448 | 5/1934 | Staufer et al. | |
| 2,030,867 | 2/1936 | Hart | 23—87 X |
| 2,723,902 | 11/1955 | Reeve et al. | 23—87 |
| 2,766,112 | 10/1956 | Schafer | 23—87 X |
| 2,870,073 | 1/1959 | Merlub-Sobel et al. | 23—87 X |
| 3,025,131 | 3/1962 | Lerner | 23—19 X |

MAURICE A. BRINDISI, *Primary Examiner.*

GEORGE D. MITCHELL, *Examiner.*

UNITED STATES PATENT OFFICE
CERTIFICATE OF CORRECTION

Patent No. 3,235,328                         February 15, 1966

Bernard J. Lerner et al.

It is hereby certified that error appears in the above numbered patent requiring correction and that the said Letters Patent should read as corrected below.

Column 5, line 46, for "chlorinate" read -- chlorinated --; column 6, line 74, for "generated" read -- regenerated --; column 7, line 19, for "containing" read -- continuing --.

Signed and sealed this 31st day of January 1967.

(SEAL)
Attest:

ERNEST W. SWIDER
Attesting Officer

EDWARD J. BRENNER
Commissioner of Patents